United States Patent [19]

Ueshima et al.

[11] 4,104,325

[45] Aug. 1, 1978

[54] RESIN COMPOSITION COMPRISING CYANO-SUBSTITUTED NORBORENE POLYMERS BLENDED WITH GRAFT COPOLYMERS

[75] Inventors: Takashi Ueshima, Yokohama; Yasuzi Tanaka; Toshiro Yokoyama, both of Kawasaki; Shoichi Kobayashi, Yokohama, all of Japan

[73] Assignee: Showa Denko K.K., Tokyo, Japan

[21] Appl. No.: 758,314

[22] Filed: Jan. 10, 1977

Related U.S. Application Data

[62] Division of Ser. No. 452,623, Mar. 19, 1974, Pat. No. 4,021,510.

[30] Foreign Application Priority Data

Sep. 19, 1972 [JP] Japan ............................... 47-93273
Oct. 4, 1973 [JP] Japan ............................. 48-110957
Oct. 5, 1973 [JP] Japan ............................. 48-111526

[51] Int. Cl.$^2$ ................. C08L 51/04; C08L 51/06; C08L 55/02
[52] U.S. Cl. ............................... 260/876 R; 526/281
[58] Field of Search ........................... 260/876 R, 898

[56] References Cited

U.S. PATENT DOCUMENTS

| | | | |
|---|---|---|---|
| 3,856,758 | 12/1974 | Ueshima et al. | 526/75 X |
| 4,022,954 | 5/1977 | Kurosawa et al. | 260/898 X |

*Primary Examiner*—Carman J. Seccuro
*Attorney, Agent, or Firm*—Carroll F. Palmer

[57] ABSTRACT

A resin composition is prepared from 5 to 95 parts by weight of a polymer prepared by ring-opening polymerization of cyano-substituted norbornene derivatives having at least one nitrile group or substituents including nitrile group and 95 to 5 parts by weight of graft copolymer obtained by grafting at least one elastomer with at least one vinyl compound selected from the group consisting of styrene, acrylonitrile and methyl methacrylate.

4 Claims, No Drawings

RESIN COMPOSITION COMPRISING CYANO-SUBSTITUTED NORBORENE POLYMERS BLENDED WITH GRAFT COPOLYMERS

This is a division of copending application Ser. No. 452,623, filed Mar. 19, 1974, now U.S. Pat. No. 4,021,510.

This invention relates to a resin composition containing a polymer prepared by ring-opening polymerization of cyanosubstituted norbornene derivatives and presenting various prominent properties. An article by R. E. Rinechart appearing in the Journal of Polymer Science (1969) Part C, No. 27, pages 7 to 25 and the Japanese Patent Publications Nos. 22705/67 and 7552/68 point out that a new type of polymer can be obtained by subjecting to ring-opening polymerization cycloolefins such as cyclooctene, cyclopentene, cyclobutene, cyclooctadiene and norbornene in an organic solvent selected from aromatic hydrocarbons such as toluene, aliphatic hydrocarbons such as n-heptane and lower alcohols such as methyl alcohol, using a catalyst prepared from halides of noble metals such as ruthenium, osmium and iridium or halides of transition metals such as titanium, molybdenum, tungsten and vanadium.

However, a joint report by Francis W. Michelotti and William P. Keaveney appearing in the Journal of Polymer Science (1965), Part A, vol. 3, pages 895 to 905 discloses that 5-chloromethyl-2-norbornene, a derivative of norbornene, can indeed be formed into fibrous polymer when subjected to ring-opening polymerization, using a catalyst of ruthenium compounds, whereas 5-cyano-2-norbornene, namely, 5-cyanobicyclo[2,2,1]-heptene-2 can not provide a polymer even when subjected to ring-opening polymerization, using a catalyst of compounds of ruthenium, osmium or iridium. As seen from the foregoing description, some of the derivatives of cycloolefins, particularly those of norbornene can be made into polymers by ring-opening polymerization, using a certain kind of a catalytic system, whereas the others of said nobornene derivatives can not be expected to admit of ring-opening polymerization even when the same kind of catalytic system is used.

The present inventors have conducted studies on the ring-opening polymerization of cyano-substituted norbornene derivatives. As the result, it has been found that polymers can be prepared by ring-opening polymerization of cyano-substituted norbornene derivatives, using a catalytic system consisting of compounds of tungsten and/or those of molybdenum and organic aluminium compounds. It has also been disclosed that said polymer can not be produced by ring-opening polymerization of cyano-substituted norbornene derivatives, using a catalytic system consisting of compounds of titanium and/or those of vanadium and organic aluminium compounds. (Japanese Patent Application 31755/72 and 108902/72)

The above-mentioned polymers prepared by ring-opening polymerization of cyano-substituted norbornene derivatives can be manufactured on an industrial scale and have not only more excellent mechanical properties such as impact strength and hardness, but also transparency and moldability than commonly used synthetic resins such as polypropylene and polyvinyl chloride, thus admitting of application in the various form, for example, containers or films by such working process as injection molding or extrusion molding customarily practised in the field of synthetic resins.

On the other hand, vinyl chloride polymers characterized by, for example, prominent tensile strength, hardness and heat resistance enjoy rapidly increasing demand. Moreover in recent years, considerable improvements have been made in the relatively low impact strength or weak point of rigid vinyl chloride resin, rendering said resin widely acceptable in various fields. However, where it is tried to elevate the impact strength of vinyl chloride polymers by compounding another type of polymer, for example, chlorinated polyethylene with said vinyl chloride polymers, there arises the disadvantage of noticeably decreasing the tensile strength, hardness, heat resistance and transparency characteristic of the vinyl chloride polymers, though incorporation of a relatively small amount of said chlorinated polyethylene may increase the impact strength of the vinyl chloride polymers. Further, addition of ABS resins (acrylonitrile-butadiene-styrene graft copolymers) or MBS resins (methyl methacrylate-butadiene-styrene graft copolymers) can indeed elevate the impact strength of the vinyl chloride polymers without noticeably reducing the tensile strength, hardness, heat resistance and transparency thereof. However, said addition is still accompanied with the unavoidable essential deterioration of said physical properties characterizing the vinyl chloride polymers, and moreover necessarily renders these polymers subject to the decline of workability, chemical resistance and weatherability.

As mentioned above, various vinyl chloride polymer compositions proposed to date for elimination of the drawbacks attendant on the vinyl chloride resin are indeed all characterized by improved impact strength but on the contrary, are offset by lower tensile strength, hardness, heat resistance and transparency. Therefore, the hitherto proposed vinyl chloride polymer compositions are not possessed of all the abovementioned properties demanded of moldable resins when said compositions are going to be put to industrial application. Therefore, strong demand has been made for the development of a new type of vinyl chloride polymer composition which can display all said properties. From this point of view, polymers of the above-mentioned cyano-substituted norbornene derivatives which have a higher impact strength than vinyl chloride polymers are expected to be utilized for improvement of the properties of the vinyl chloride polymers.

Though possessed of many superior properties to other synthetic resins in common use, the above-mentioned polymers prepared by ring-opening polymerization of cyano-substituted norbornene derivatives can not always be deemed to present satisfactory workability and impact strength when molded into, for example, mechanical parts, window frames, helmets and light covers (such as those for covers of street lamps).

The present inventors have found that incorporation of rubbery material in the polymers prepared by ring-opening polymerization of cyano-substituted norbornene derivatives can prominently elevate the impact strength thereof, and have already proposed (Japanese Patent Application No. 97233/73). However, addition of such rubbery material is still accompanied with the drawback of decreasing the tensile strength of the polymers of cyano-substituted norbornene derivatives, though increasing the impact strength thereof.

The customary practice of improving the workability of general synthetic resins is either to reduce the molecular weight thereof or to add a plasticizer well miscible therewith. However, these processes have the disadvantage of lowering the tensile strength, hardness and softening point of synthetic resins, though increasing the workability thereof.

It is accordingly the object of this invention to provide synthetic resin compositions which are free from the aforesaid difficulties accompanying the prior art and can display excellent impact strength, workability and so on.

The resin compositions of this invention are characterized by comprising 5 to 95 parts by weight of polymers prepared by ring-opening polymerization of cyano-substituted norbornene derivatives and 95 to 5 parts by weight of graft copolymer obtained by grafting at least one elastomer with at least one vinyl compound selected from the group consisting of styrene, acrylonitrile and methyl methacrylate, said cyano-substituted norbornene derivatives being expressed by the general formula

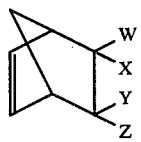

where:
W, X, Y and Z = radicals selected from the group consisting of hydrogen, nitrile group, substituents containing nitrile group, alkyl radical having 1 to 20 carbon atoms, alkenyl radical having 1 to 20 carbon atoms, aryl radical having 1 to 20 carbon atoms and aralkyl radical having 1 to 20 carbon atoms; and at least one of said W, X, Y and Z is the radical being selected from the group consisting of nitrile group and substituents containin nitrile group.

The resin compositions of this invention have not only prominent impact strength and workability but also heat resistance, tensile strength and hardness.

Cyano-substituted norbornene derivatives used as a monomer in this invention contain at least one nitrile group or substituent including nitrile group in the position of 5 and/or 6 of bicyclo [2,2,1]-heptene-2 as indicated in the following general formula representing the chemical structure of said monomer:

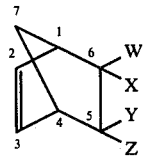

where:
W, X, Y and Z represent the aforementioned radicals.

The aforesaid substituents having nitrile group include the cyano methyl radical, cyanoethyl radical, cyanopropyl radical, cyano-n-butyl radical, cyano-isobutyl radical and ω-cyano-n-heptyl radical. The hydrocarbon radicals include the methyl radical, ethyl radical, propyl radical, n-butyl radical, isobutyl radical, octyl radical, phenyl radical, cyclohexyl radical and 2-octenyl radical.

The monomers whose chemical structure may be expressed by the above-mentioned general formula can be prepared by reacting cyclopentadiene with vinyl compounds containing the nitrile group, namely, by Diels-Alder reaction (refer to an article by H. L. Holmes appearing in "Organic Reaction", Vol. 4, pages 60 to 173, published in 1948 by John Wiley and Sons, Inc.). Said monomers may also be obtained by reacting dicyclopentadiene with vinyl compounds containing the nitrile group. The vinyl compounds bearing the nitrile group which may be used in said reaction include acrylonitrile, methacrylonitrile, α-n-octyl acrylonitrile, vinylidene cyanide, fumaronitrile, maleonitrile, allylcyanide, cinnamonitrile and linolonitrile. From said vinyl compounds bearing the nitrile group are derived through the aforesaid Diels-Alder reaction, 5-cyano bicyclo [2,2,1]-heptene-2, 5-cyano-5-methyl bicyclo[2,2,1]-heptene-2, 5-cyano-5-n-octyl bicyclo[2,2,1]-heptene-2, 5,5-dicyano bicyclo[2,2,1]-heptene-2, 5,6-dicyano bicyclo[2,2,1]-heptene-2, 5-cyano-6-phenyl bicyclo [2,2,1]-heptene-2, and a mixture of 5-ω-cyano-n-heptyl, 6-n-2-octenyl bicyclo[2,2,1]-heptene-2 and 5-ω-cyano-2-decenyl, 6-n-pentyl bicyclo[2,2,1]-hepene-2. The substituent may take the endo or exo position. Though the cyano-substituted norbornene derivatives consist of two groups of isomers represented by the endo and exo positions occupied by the substituent radicals, yet said different groups of isomers can be effectively separated from each other by precision distillation. The endo type isomer, for example, 5-cyano-bicyclo[2,2,1]-heptene-2 remains solid at room temperature and has a boiling point of 88° C in an atmosphere reduced to 12 mm Hg. The exo type is a colorless liquid at room temperature, and has a boiling point of 80.5° C in an atmosphere reduced to 12 mm Hg, a density of 1.0065 g/cc at 20° C and a refractive index of 1.4862 with respect to the D line of sodium at 20° C. Said isomers can be used in a separated or nonseparated stae in performing the ring-opening polymerization. It is possible to use a single or two or more types of the above-mentioned cyano-substituted norbornene derivatives.

The polymers of cyano-substituted norbornene derivatives can be prepared by ring-opening polymerization of the various types of cyano-substituted norbornene derivatives obtained by the above-mentioned process in the presence or absence of an inert organic solvent using a catalytic system consisting of a mixture of organic aluminium compounds and compounds of tungsten and/or those of molybdenum or a catalytic system consisting of said mixture to which there is added at least one compound selected from the group consisting of water, peroxides, epoxides, organic halides, acetal compounds, orthocarbonic acid esters and alcoholic compounds.

The ring-opening polymerization is effected through the following process:

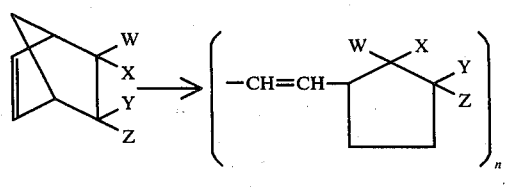

where:

W, X, Y and Z denote the aforementioned radicals.

The polymers obtained present different properties from various factors, namely, according as the double bond of the polymer is of the cis or trans type, or depending on the mutual substitution positions and steric positions of the substituents.

Cyano-substituted norbornene derivatives are sometimes likely to polymerize through their $c=c$ double bond according to the following scheme, that is, vinyl polymerization.

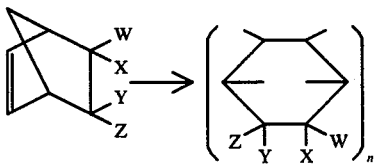

where W, X, Y and Z denote the aforementioned radicals.

However, said vinyl polymerization produces polymer with chemical structure different from the polymers used in this invention.

Organic aluminium compounds constituting a part of the catalytic system used in the ring-opening polymerization are of the type whose chemical structure may be expressed by the general formula $AlR_3$ or $AlR_n X_{3-n}$ (where R represents the alkyl or aryl radical, X denotes halogens, hydrogen or alkoxy radical and $n$ is 1, 1.5 or 2) or $AlR_3 \cdot H_2O$ (where the mol ratio of $H_2O$ to $AlR_3$ has a value of $<1.5$).

Compounds represented by $AlR_3$, i.e., trialkyl aluminium include trimethyl aluminium, triethyl aluminium, tri-n-propyl aluminum, triisopropyl aluminium, triisobutyl aluminium, trihexyl aluminium and trioctyl aluminium, and triaryl aluminium such as tribenzyl aluminium and triphenyl aluminium.

Compounds denoted by $AlR_2X$ include dialkyl aluminium monohalides such as diethyl aluminium monochloride, di-n-propyl aluminium monochloride, diisobutyl aluminium monochloride, di-n-butyl aluminium monochloride, diethyl aluminium monobromide, and diethyl aluminium monoiodide; dialkyl aluminium monohydrides such as diethyl aluminium monohydride, di-n-propyl aluminium monohydride, and di-isobutyl aluminium monohydride; diaryl aluminium monohalides such as dibenzyl aluminium monochloride, diphenyl aluminium monochloride, dibenzyl aluminium monobromide, and ditolyl aluminium monochloride; and dialkyl aluminium monoalkoxides such as diethyl aluminium monoethoxide, and diisobutyl aluminium monobutoxide.

Compounds indicated by $AlR_{1.5}X_{1.5}$ include ethyl aluminium sesquichloride, ethyl aluminium sesquibromide, and diisobutyl aluminium sesquichloride.

Compounds represented by $AlRX_2$ include alkyl aluminium dihalides such as ethyl aluminium dichloride, ethyl aluminium dibromide, propyl aluminium dichloride, isobutyl aluminium dichloride, ethyl aluminium dibromide, and ethyl aluminium diiodide; aryl aluminium dihalides such as benzyl aluminium dichloride, benzyl aluminium dibromide, tolyl aluminium dichloride, and phenyl aluminium dichloride; and alkyl aluminium dialkoxides such as ethyl aluminium diethoxide.

Mixtures denoted by $AlR_3 \cdot H_2O$ are mixtures of trialkyl aluminium and water in which the trialkyl aluminium accounts for at least 2 mols based on 3 mols of water. Such mixtures include, for example, mixture of triethyl aluminium and water in which said triethyl aluminium and water should be in the ratio of 1:0.5.

Most preferable among the above-listed organic aluminium compounds are triethyl aluminium, triisobutyl aluminium, trihexyl aluminium, diethyl aluminium monochloride, di-n-butyl aluminium monochloride, ethyl aluminium sesquichloride, diethyl aluminium monobutoxide and a mixture of triethyl aluminium and water in which the triethyl aluminium and water bear the mole ratio of 1:0.5.

Compounds of tungsten and molybdenum partly constituting the catalytic system used in the method of this invention include halides of tungsten and molybdenum such as tungsten hexachloride, tungsten pentachloride, tungsten hexafluoride, tungsten pentafluoride, molybdenum pentachloride, molybdenum hexachloride, molybdenum pentafluoride, molybdenum hexafluoride, molybdenum pentabromochloride and molybdenum pentabromide; oxyhalides of tungsten and molybdenum such as tungsten oxytetrachloride, tungsten oxytetrabromide, tungsten oxydichloride, molybdenum oxytrichloride, and molybdenum oxytetrachloride, in addition, molybdenum dioxydiacetyl acetonate [$MoO_2(CH_3COCH=C(CH_3)O-)_2$, hereinafter referred to as $MoO_2(AcAc)_2$], tungsten hexaalcoholate, tungsten hexaphenolate, tetrachlorotungsten diphenolate, tetrachlorotungsten dialcoholate, dichloromolybdenum dialcoholate, and dichloromolybdenum triphenolate; and halides of aluminium-tungsten, for example, $Al_4W_3Cl_{18}$ obtained by reducing halides of tungsten by powders of aluminium. Most preferable among the above-listed compounds of tungsten and molybdenum are molybdenum pentachloride, tungsten hexachloride, and tungsten oxytetrachloride ($WOCl_4$). The mole ratio of organic aluminium compounds to the compounds of tungsten or molybdenum is generally more than 0.1, preferably more than 0.5. Use of less than 0.1 mol of organic aluminium compounds based on 1 mol of compounds of tungsten or molybdenum failed to attain practical polymerization activity. A catalytic system consisting of 10 mols of organic aluminium compounds based on 1 mol of compounds of tungsten or molybdenum realized an extremely high degree of polymerization activity.

While, in the ring-opening polymerization, the above-mentioned binary catalytic system consisting of organic aluminium compounds and compounds of tungsten or molybdenum can effect the ring-opening polymerization of cyano-substituted norbornene derivatives, addition of a third component to said binary catalytic system to convert it into a ternary system prominently promotes the polymerization activity and further varies the properties of the polymers obtained using said binary catalytic system.

Said third component may be formed of at least one compound selected from the group consisting of water, peroxides, epoxides, organic halides, acetal compounds, alcoholic compounds, phenolic compounds, orthoformic acid esters, and orthocarboxylic acid esters. The peroxides include alkyl peroxides such as t-butyl peroxide; aryl peroxides such as benzoyl peroxide; alkyl or aralkyl hydroperoxides such as t-butyl hydroperoxide and cumene hydroperoxide; hydrogen peroxide; peracids such as peracetic acid; and esters, ketones and aldehydes derived from said peracids. The expoxides include ethylene oxide, propylene oxide, butenel oxide, epichlorohydrin, allyl glycidyl ether, and butadiene monoxide. The organic halides include t-butyl hypohalite compounds; allyl halides such as allyl chloride; t-alkyl halides such as t-butyl chloride; halogenated ketones such as α-chloroacetone; and halogenated alcohols such as 2-chloroethanol. The acetal compounds include acetaldehyde diethylacetal, diethoxy methane, acetone dimethyl acetal, and dichloroacetaldehyde dimethyl acetal. The alcoholic compounds include methyl alcohol, ethyl alcohol, n-propyl alcohol, n-butyl alcohol and isobutyl alcohol.

The phenolic compounds include phenol, p-methyl phenol, p,p'-isopropylidene diphenol, 2,6-dimethylphenol, p-chlorophenol, 1,3-benzenediol and 1,3,5-benzenetriol. The orthoformic acid esters include methyl orthoformate and ethyl orthoformate. The orthocarboxylic acid esters include ethyl orthoacetate, n-propyl orthopropionate and butyl orthophenylacetate. Preferable among the orthocarboxylic acid esters are orthoalkyl formate and particularly orthomethyl formate and orthoethyl formate. Water is also an effective third component of the subject catalytic system. While the amount of the third component added varies with its type, its proportion is generally 0.1 to 6 mols, or preferably 0.3 mols based on 1 mol of compounds of tungsten or molybdenum.

While the amount of the subject catalytic system added to the monomer of cyano-substituted norbornene derivatives varies with the type of said monomer, etc. the compounds of tungsten or molybdenum should generally be added at the rate of 0.001 to 20 mols, or preferably 0.1 to 5 mols based on 100 mols of said monomer. Addition of more than 20 mols of the compounds of tungsten or molybdenum based on 100 mols of said monomer not only results in high cost but also fails to promote the catalytic action, namely, such excess addition does not elevate the degree of polymerization activity. Further, if unduly large amounts of said compounds of tungsten or molybdenum are used, the reaction system will still contain, after completion of the ring-opening polymerization, such amounts of residual tungsten or molybdenum compounds as will be difficult to eliminate. The presence of said catalytic component in the polymer obtained will undesirably color the polymer. Said coloration increases the tint of a resin composition containing such colored polymer in the subsequent molding operation, giving rise to the thermal deterioration of the resultant product.

As previously mentioned, the ring-opening polymerization of cyano-substituted norbornene derivatives can be carried out using the previously described catalytic system with or without an inert organic solvent. Said inert organic solvent is preferred to be the type which does not harmfully affect the catalytic system. Typical of said solvents are aliphatic hydrocarbons such as pentane, heptane, hexane, petroleum ether and decane; aromatic hydrocarbons such as benzene, toluene and xylene; alicyclic hydrocarbons such as cyclohexane, decaline and cyclooctane; halogenized hydrocarbons such as methylene chloride; 1,2-dichloroethane, 1,2-dichloropropane, chloroform, chlorobenzene and carbon tetrachloride; and ethers such as diethyl ether and tetrahydrofuran. The above-listed inert organic solvents may be used alone or in combination.

The catalytic components, monomer (cyano-substituted norbornene derivatives) and inert organic solvent (if used) may be added in various sequential orders. The typical sequence is to add first the inert organic solvent, secondly the monomer, thirdly the compounds of tungsten or molybdenum, fourthly the third component (if used), and finally organic aluminium compounds. It is also possible to mix the desired compounds among the catalytic components, monomer and solvent or heat them separately before they are used in the ring-opening polymerization.

The object of the ring-opening polymerization can be fully attained, as previously described, by the ring-opening polymerization of cyano-substituted norbornene derivatives in the presence of a catalytic system consisting of compounds of tungsten and/or those of molybdenum and organic aluminium compounds or a mixture of said both types of compounds and the aforesaid third component. Yet, the molecular weight of the resultant polymer can be controlled by adding to the polymerization system α-olefins such as ethylene, propylene, butene-1 and hexene-1; internal olefins such as butene-2 and hexene-2; conjugated diolefins such as butadiene and isoprene; or nonconjugated diolefins such as 1,4-hexadiene. In this case, it is generally advised to add 0.01 to 10 parts by weight of said molecular weight controlling agent based on 100 parts by weight of the monomer of cyano-substituted norbornene derivatives.

As previously mentioned, the polymer can be obtained by the ring-opening polymerization of the subject monomer in the presence of an inert organic solvent or in the absence of said solvent. (bulk polymerization) If used, said inert organic solvent is generally preferred to be added at the rate of 1 to 10 parts by volume based on 1 part volume of the monomer.

The ring-opening polymerization is carried out generally at a temperature ranging from −100° C to +200° C or preferably −40° C to 100° C. At a lower temperature than −100° C, the reaction system does not display desirable polymerization activity with the resultant extremely slow progress of polymerization. In such case, progress of the polymerization consumes a great deal of time, sometimes causing a mixture of the inert organic solvent and monomer to be solidified. Conversely, a higher temperature than 200° C fails to provide a good quality of polymer prepared by ring-opening polymerization, and is practically undesirable.

The ring-opening polymerization is preferred to take place in an inert atmosphere such as, argon and nitrogen. If oxygen and moisture are present in the reaction system, then the catalytic components i.e., the organic aluminium compounds and the compounds of tungsten or molybdenum will be changed to obstruct the reproducibility of said polymerization.

The elimination of the catalyst residue and the recovery of the polymer produced after completion of the ring-opening polymerization may be effected by the processes customarily used in the solution polymerization of isoprene and butadiene. Namely, when a solution resulting from the ring-opening polymerization, that is, a solution containing the polymer obtained by said polymerization, the unreacted portion of the monomer and the catalyst residue is poured into lower alcohol, for example, methyl alcohol or ethyl alcohol containing a small amount of hydrochloric acid, then the catalyst residue will be eliminated and the polymer produced will be precipitated at the same time. The object of the elimination of the catalyst residue and the recovery of the polymer can be further achieved by first uniformly diluting the solution resulting from the ring-opening polymerization using solvent immiscible with water, for example, methylene chloride, then by treating said solution with water containing a chelating agent such as nitrilotriacetic acid or ethylene diamine tetraacetic acid to eliminate the catalyst residue and afterwards by recovering the polymer and the organic solvent by the steam stripping process.

The polymers prepared by ring-opening polymerization of cyano-substituted norbornene derivatives include not only homopolymers of cyano-substituted norbornene derivatives obtained by the above-mentioned process but also copolymers prepared by the ring-opening polymerization of a mixture of the cyano-substituted norbornene derivatives as a main component and other cycloolefinic compounds which is carried out in the same manner as in producing the homopolymers of said cyano-substituted norbornene derivatives.

Other cycloolefinic compounds used as comonomers in producing the above-mentioned copolymers typically include monocyclic olefins such as cyclopentene, cycloheptene and cyclododecene; nonconjugated cyclopolyenes such as 1,5-cyclooctadiene, 1,5,9-cyclododecatriene, 1-chloro, 1,5-cyclooctadiene and norbornadiene; ester type norbornene derivatives such as 5-methoxy carbonyl-5-methyl-bicyclo [2,2,1]-heptene-2, 5-acetoxy-bicyclo [2,2,1]-heptene-2, 5,6-dimethoxy carbonylbicyclo[2,2,1]-heptene-2 and 5-ω-carbomethoxy-n-heptyl-6-n-octyl-bicyclo [2,2,1]-heptene-2; ether type norbornene derivatives such as 5-methoxybicyclo [2,2,1]-heptene-2, 5-ethoxybicyclo [2,2,1]-heptene-2, 5-cyclohexoxy-bicyclo [2,2,1]-heptene-2, 5-methoxy methyl-bicyolo [2,2,1]-heptene-2, 5-methoxy-6-methoxy methyl-bicyclo [2,2,1]-heptane-2, and 5-phenoxy-bicyclo [2,2,1]-heptene-2; acid anhydride type norbornene derivatives such as 3,6-methylene-1,2,3,6-tetrahydro-cisphthalic anhydride, 6-(5-carboxy-bicyclo [2,2,1]-2-heptenyl) acetic anhydride, 4,7-methano-1-methyl-1,2,3,3a, 4,7,7a,8-naphthalene-1,2-dicarboxylic anhydride and 4-(bicyclo [2,2,1]-2-heptenyl) phthalic anhydride; imide type norbornene derivatives such as N-methyl-3,6-methylene-1,2,3,6-tetrahydro-cis-phthalimide, N-methyl-3,6-methylene-1-methyl-1,2,3,6-tetrahydro-cis-phthalimide, bicyclo [2,2,1] hepta-2-ene-5-spiro-3'-(n-ethyl succinimide), 2-methyl-2-aza-1,3-dioxo-5,8-methano-1,2,3,4, 4a, 5,8,8a-octahydronaphthalene, N-ethyl-5,8-methano-1,2,3,4,4a,5,8,8a-ocathydronaphthalene-2,3-dicarboxyimide, N-methyl-4-(5-norborna-2-enyl) phthalimide, N-(5-norborna-2-enyl) methylmaleimide, N-(5-norborna-2-enyl) methylcitraconimide and N-(5-norborna-2-enyl) methyl-naphthalene-2,3-dicarboxyimide; aromatic norbornene derivatives such as 1,4-dihydro-1,4-methanonaphthalene, 1,4-dihydro-1,4-methano-6-methylnaphthalene, 1,4-dihydro-1,4-methano-6-methoxycarbonyl naphthalene, 6-chloro-1,4-dihydro-1,4-methanonaphthalene, 5,8-diacetoxy-6,7-dichloro-1,4-dihydro-1,4-methanonaphthalene, 5,8-diacetoxy-1,4-dihydro-1,4-methano-6-methylnaphthalene, 5,8-diacetoxy-1,4-dihydro-6,7-dimethoxy-1,4-methanonaphthalene, 1,4-dihydro-1,4-methanoanthracene, 9,10-diacetoxy-1,4-dihydro-1,4-methanoanthracene and 1,4-dihydro-9,10-diphenyl-1,4-methanoanthracene; polar group-bearing norbornene derivatives, for example, halogen type norbornene derivatives such as 5-chloro-bicyclo [2,2,1]-heptene-2, 5,5-dichloro-bicyclo [2,2,1]-heptene-2 and 5,6-dichlorobicyclo [2,2,1] heptene-2; and bicyclo [2,2,1]-heptene-2 (norbornene).

Where the above-mentioned copolymers of cyano-substituted norbornene derivatives are used in producing the resin compositions of this invention, it is preferred that said copolymers be formed by ring-opening polymerization of a mixture containing one mol at most of other cycloolefinic compounds based on one mol of cyano-substituted norbornene derivatives. Where said other cycloolefinic compounds, for example, monocyclic olefins such as cyclopentene and cyclooctene are used at the rate of more than one mol based on one mol of cyano-substituted norbornene derivatives, then the resin composition containing the resultant copolymers will have lower surface hardness and softening point.

The elastomers include butadiene rubbers, acrylic esters rubbers, chlorinated polyethylene and ethylene-propylene rubbers. The elastomer may be used alone or in combination.

The butadiene rubbers consist of butadiene rubber (butadiene homopolymer) or sytren-butadiene rubber or acrylonitrile-butadiene rubber (a copolymer of butadiene as a main component and styrene or acrylonitrile). Said copolymer may be formed of a random copolymerized or block copolymerized type. The acrylic esters rubbers may include a copolymer prepared from acrylic esters as a main component and a small amount of, for example, acryl nitrile. These rubbers may be produced by emulsion polymerization. Chlorinated polyethylene is prepared by chlorinating the ethylene homopolymer of high density ranging from 0.93 to 0.97 g/cc or a copolymer of ethylene-α-olefin in a solvent or aqueous suspension. The chlorine content of the chlorinated polyethylene is generally 25 to 45 percent by weight. The ethylene-propylene rubbers are obtained by copolymerizing a mixture of ethylene and propylene or said mixture containing a small amount of straight chain or branched chain diolefin having two double bonds at the chain end such as 1,4-pentadiene, 1,5-hexadiene and 3,3-dimethyl-1,5-hexadiene, or straight chain or branched chain diolefin having a single double bond at the chain end such as 1,4-hexadiene and 6-methyl-1,5-heptadiene, or cyclic diene compounds such as bicyclo [2,2,1]-heptene-2. The ethylenepropylene rubbers are preferred to be a type in which the monomer unit of ethylene bears a weight ratio of 35 : 65 to 65 : 35 to that of propylene. All the above-mentioned rubbers or elastomer are prepared on an industrial scale by copolymerizing the components using a catalyst mainly consisting of organic aluminium compounds and transition metal compounds, and are widely accepted in various fields.

The graft copolymers used in this invention can be produced by grafting at least one vinyl compound selected from the group consisting of styrene, acrylonitrile and methyl methacrylate to the aforesaid elastomer. Said grafting may be effected by any of bulk polymerization, solution polymerization, emulsion polymerization and suspension polymerization or a combination thereof (for example, a combination of bulk polymerization and suspension polymerization).

The graft copolymers produced by the above processes typically include high impact styrene resin prepared by grafting styrene to butadiene rubber or styrene-butadiene; acrylonitrile-butadiene-styrene terpolymer (ABS resin) obtained by grafting styrene and acrylonitrile to butadiene rubber, styrene-butadiene rubber or acrylonitrile-butadiene rubber (nitrile rubber); methyl methacrylate-butadiene-styrene terpolymer prepared by grafting styrene and methyl methacrylate to butadiene rubber, or styrene-butadiene rubber, acrylonitrile-acrylic ester-styrene terpolymer (AAS resin) formed by grafting styrene and acrylonitrile to acrylic esters rubbers namely acrylic rubbers (copolymer of acrylic esters as a main component and a small amount of, for example, acrylonitrile); graft copolymers (ACS resin) obtained by grafting acrylonitrile and styrene to chlorinated polyethylene (CPE); and graft copolymers (AES resin) formed by grafting acrylonitrile and styrene to ethylene-propylene rubber (ethylene-propylene copolymer; EPR or EPM) or ethylene-propylene termpolymer (EPT or EPDM). All these graft copolymers are mostly manufactured on an industrial scale by the known process.

The subject resin compositions of high impact strength are chosen to consist of 5 to 95 or preferably 30 to 95 parts by weight of the polymers of cyano-substituted norbornene derivatives and 95 to 5 or preferably 70 to 5 parts by weight of the graft copolymers.

The resin compositions of the invention thus prepared have not only high impact strength but also tensile strength, surface hardness and softening point or heat resistance.

If necessary, said resin compositions of high impact strength may further be blended with synthetic resins such as the homopolymer or copolymers of vinyl chloride and methyl methacrylate resins (PMMA resin) or elastomer such as acrylonitrile-butadiene rubber (NBR), or butadiene rubber, styrene-butadiene rubber, chlorinated polyethylene, chloro-sulfonated polyethylene, ethylene-propylene rubber, ethylene-propylene terpolymer, chloroprene rubber (CR) and acrylic rubber.

The constituents of the resin compositions of the invention are generally mixed by a dry blender such as a ribbon blender, rotary cone mixer, rotary mixer or Henschel mixer. However, a mixer such a a hot roll mixer, Banbury mixer or melt extruder is convenient, because it can mix the above-mentioned constituents in a molten state homogeneously with relative ease. Further depending on the kinds of said constituents, the process can be suitably adopted which consists in adding a constituent to a solution in which other constituent is dissolved or an aqueous or organic suspension in which other constituent is kept in a suspended state and thereafter distilling out water or an organic solvent for their uniform mixing.

The subject resin composition consisting of graft copolymers and the polymers of cyano-substituted norbornene derivatives can be prepared by mixing both components without applying any particular method and consuming any long time.

It is possible to incorporate various additives used with general resins such as, fire retardant, plasticizer, lubricant, reinforcing agent, filler, antistatic agent, electric property improver, ultraviolet absorbent, foaming agent and coloring agent in the resin compositions of this invention. Said incorporation is also included in this invention.

The resin compositions of this invention can be molded by compression molding, extrusion molding, injection molding, blow molding and casting applied to general types of synthetic resin into various products such as sheets, boards, rods, pipes, films including secondary worked articles, for example, bags, packing material, various containers, electrical parts including illumination implements, daily sundry goods, furniture, toys, agricultural tools, machine parts, etc.

This invention will be more fully understood with reference to the examples and controls which follow. Throughout the examples and controls, the Vicat softening point was determined with a test piece 3 mm thick by measuring the temperature (° C) at which a needle was inserted 1 mm into the test piece by the Vicat softening point testing method set forth in ASTM D-1525-58T. The Rockwell represents a value of the surface hardness (R) of the test piece measured at 20° C pursuant to ASTM D-785-51. The Izod impact strength was measured by using a notched test piece 3 mm thick in a thermostat at 20° C according to ASTM D-256-56. The tensile strength denotes a value measured by stretching a No. 3 dumbbell shaped test piece 1 mm thick specified in JIS (Japanese Industrial Standard) at a speed of 5 cm/min in a thermostat at 20° C. The melt viscosity was measured by subjecting the resin to a load of 100 kg at 200° C using the Koka type flow tester provided with a nozzle 1 mm in diameter and 10 mm long.

EXAMPLE 1

A dried nitrogen-filled 10 l autoclave was charged with 4500 ml of 1,2-dichloroethane, 1500 ml (12 mol) of 5-cyano-bicyclo [2,2,1]-heptene-2 (cyanonorbornene) monomer, 10.1 ml of n-hexene-1 (0.12 mol) and 120 ml of a 1,2-dichloroethane solution containing 0.2 mol of hexachlorotungsten-acetaldehyde diethylacetal (both components bear a molar ratio of 1:2 and the hexachlorotungsten amounts to 24 millimols, namely, accounts for 0.2 mol% based on the above-mentioned monomer). The reaction system was heated to 70° C. 11.9 ml (96 millimols) of diethyl aluminium chloride was added to the reaction system. After polymerization was conducted for 5 hours with stirring, the reaction system was treated with 200 ml of ethanolamine and 10 g of bis (2-hydroxy-3-t-butyl-5-methyl phenyl) methane (manufactured by Yoshitomi Chemicals Mfg. Co. under the trade name "Yoshinox 2246") as a stabilizer. The mass was further stirred for 30 minutes at the same temperature. The resultant system (or a solution containing the polymer produced) was diluted with 1,2-dichloroethane (said polymer has a concentration of about 10% by weight). 4000 ml of an aqueous solution containing 1% by weight of trisodium salt of nitrilotriacetic acid was added, followed by vigorous stirring for 30 minutes at 20° C. After allowed to stand, the mass was separated into a phase of water and that of the 1,2-dichloroethane, followed by removal of the water phase. After this operation was repeated three times, water washing carried out. When the pH of the solution was determined to be 7, the polymer was precipitated for separation by addition of a large amount of methyl alcohol. The polymer thus purified was dried overnight at 50° C in vacuum of less than 1 mmHg, providing 1150 g of substantially colorless transparent polymer. The conversion rate accounted for 80 per cent of the raw monomer. The product polymer had an intrinsic viscosity of 0.64, Izod impact strength of 6.3 kg.cm/cm-notch, Vicat softening point of 126° C, Rockwell hardness R of 127 and melt viscosity of $8.6 \times 10^5$ poises.

EXAMPLE 2

100 parts by weight of 5-cyano-bicyclo [2,2,1]-heptene-2 polymer prepared by ring-opening polymerization using the same method as applied in Example 1, 20 parts by weight of polystyrene (manufactured by Japan Polystyrene Mfg. Co. under a trade name "Esbrite") having a melt viscosity of $1.2 \times 10^3$ posies, Izod impact strength of 10 kg.cm/cm-notch, Vicat softening point of 78.9° C and Rockwell hardness R of 118 and 0.5 part by weight of bis (2-hydroxy-3-t-butyl-5-methyl phenyl) methane as a stabilizer were kneaded together 5 minutes on a hot roll mill heated to 175° C. The mixture thus obtained was hot pressed 3 minutes at a pressure of 100 kg/cm² at 200° C, and further pressed 3 minutes at a pressure of 100 kg/cm² with a water-cooled press to form a plate 3 mm thick. This plate had an impact strength of 3.3 kg.cm/cm-notched, Rockwell hardness R of 120. The above-mentioned mixture had a melt viscosity of $3.0 \times 10^5$ poises and Vicat softening point of 121° C.

EXAMPLE 3

80 parts by weight of 5-cyano-bicyclo[2,2,1]-heptene-2 polymer prepared by ring-opening polymerization in the same manner as in Example 2, 20 parts by weight of acrylonitrilebutadiene-styrene terpolymer (manufactured by Toray Industries, Inc. under a trade name "Toyolac 100") having an Izod impact strength of 28.5 kg.cm/cm-notch, Rockwell hardness R of 105 and Vicat softening point of 112° C and 0.5 part by weight of bis(2-hydroxy-3-t-butyl-5-methyl phenyl) methane as a stabilizer were kneaded on a hot roll mill as in the same manner as in Example 2. The kneaded mixture was further hot pressed and then cold pressed into a plate 3 mm thick by a hot press and a water cooled press as in Example 5. The plate had an Izod impact strength of 30.5 kg.cm/cm-notched, Rockwell hardness R of 121 and Vicat softening point of 130° C.

EXAMPLE 4

Kneading was conducted on a hot roll mill in the same manner as in Example 3, excepting that the acrylonitrilebutadiene-styrene terpolymer of Example 19 was replaced by a terpolymer prepared by grafting styrene and acrylonitrile to ethylene-propylene rubbers (manufactured by Toray Industries, Inc. under a trade name "WH-1000") and having an Izod impact strength of 9.3 kg.cm/cm-notched, Rockwell hardness R of 110 and Vicat softening point of 104° C. The kneaded mixture was hot pressed and then cold pressed into a plate in the same manner as in Example 3. The plate had an Izod impact strength of 15.4 kg.cm/cm-notched, Vicat softening point of 127° C and Rockwell hardness R of 120.

EXAMPLE 5

Kneading was conducted on a hot roll mill in the same manner as in Example 3, excepting that the acrylonitrilebutadiene-styrene terpolymer of Example 3 was replaced by a terpolymer prepared by grafting styrene and methyl methacrylate to butadiene rubbers (manufactured by Toray Industries, Inc. under a trade name "Toyolac 900") and having an Izod impact strength of 15.2 kg.cm/cm-notch, Rockwell hardness R of 99 and Vicat softening point of 106° C. The kneaded mixture was hot pressed and then cold pressed into a plate in the same manner as in Example 3. The plate had an Izod impact strength of 19.3 kg.cm/cm-notched, Vicat softening point of 126° C and Rockwell hardness R of 119.

EXAMPLE 6

A 1l autoclave was charged with 175 ml of distilled water, 125 ml of 2% aqueous polyvinyl alcohol solution, 5g of tricalcium phosphate and 0.025g of sodium salt of dodecylbenzene sulfonic acid, and thereafter with 40g of chlorinated polyethylene with 40 weight % chlorine content. The charged materials were thoroughly mixed at room temperature. The autoclave was further charged with the mixture of 104g of methyl methacrylate and 56g of styrene in which there were dissolved 0.32g of t-butyl peroxyacetate and 0.48g of t-dodecyl mercaptan. After the interior of the autoclave was substituted by nitrogen, copolymerization was carried out first 4 hours at 105° C and then 2 hours at 145° C. Upon completion of the copolymerization, the product was washed with an aqueous solution of hydrochloric acid and then with water, and vacuum dried overnight at 50° C. In this case, the yield of a product copolymer was 99.5%. The product was formed of slightly rough particles. Said graft copolymer had an Izod impact strength of 32.3 kg.cm/cm-notched, Vicat softening point of 103° C and Rockwell hardness R of 101.

Kneading was conducted on a hot roll mill in the same manner as in Example 3, excepting that the acrylonitrile-butadiene-styrene terpolymer was replaced by the graft copolymer (terpolymer) produced by the above-mentioned process. The kneaded mixture was hot pressed and then cold pressed into a plate in the same manner as in Example 3. The plate had an Izod impact strength of 29.3 kg.cm/cm-notched, Vicat softening point of 124° C and Rockwell hardness R of 121.

EXAMPLE 7

Kneading was carried out on a hot roll mill in the same manner as in Example 3, excepting that the acrylonitrilebutadiene-styrene terpolymer of Example 3 was replaced by a graft copolymer prepared by grafting styrene alone to butadiene rubbers (manufactured by Japan Polystyrene Mfg. Co. under a trade name "Esbrite 500A") and having an Izod impact strength of 12.2 kg.cm/cm-notched, Rockwell hardness R of 119 and Vicat softening point of 79.1° C. The kneaded mixture was hot pressed and then cold pressed into a plate in the same manner as in Example 3. The plate had an Izod impact strength of 21.3 kg.cm/cm-notched, Vicat softening point of 120° C and Rockwell hardness R of 120.

What we claim is:

1. Rosin compositions comprising 5 to 95 parts by weight of polymers prepared by ring-opening polymerization of cyano-substituted norbornene derivatives and 95 to 5 parts by weight of graft copolymers prepared by grafting at least one vinyl compound selected from the group consisting of styrene, acrylonitrile and methyl methacrylate to at least one elastomer selected from the group consisting of butadien rubbers, acrylic esters rubbers, chlorinated polyethylene and ethylene-propylene rubbers, said cyano-substituted norbornene derivatives being expressed by the general formula

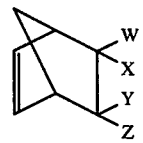

where:
W, X, Y and Z = radicals selected from the group consisting of hydrogen, nitrile group, substituents containing nitrile group, alkyl radical having 1 to 20 carbon atoms, alkenyl radical having 1 to 20 carbon atoms, aryl radical having 1 to 20 carbon atoms and aralkyl radical having 1 to 20 carbon atoms; and at least one of said W, X, Y and Z is the radical being selected from the group consisting of nitrile group and substituents containing nitrile group.

2. Resin compositions according to claim 1 wherein the polymers prepared by ring-opening polymerization are copolymers prepared by ring-opening polymerization of the cyano-substituted norbornene derivatives containing other cycloolefinic compounds.

3. Resin compositions according to claim 2 wherein the cycloolefinic compounds are those selected from the group consisting of monocyclic olefins, nonconjugated cyclopolyenes, ester type norbornene derivatives, other type norbornene derivatives, acid anhydride type norbornene derivatives, imide type norbornene derivatives, aromatic norbornene derivatives, halogen type norbornene derivatives and bicyclo [2,2,1]-heptene-2.

4. Resin compositions according to claim 3 wherein the elastomers are those selected from the group consisting of butadiene styrene-butadiene rubber, acrylonitrile butadiene rubber, acrylic esters-acrylonitrile copolymer, chlorinated ethylene homopolymer, chlorinated ethylene-α olefin copolymer, ethylene-propylene rubber and ethylene-propyleneterpolymer.

* * * * *